US008365093B2

United States Patent
Mäkelä

(10) Patent No.: US 8,365,093 B2
(45) Date of Patent: Jan. 29, 2013

(54) APPARATUS, METHOD AND COMPUTER PROGRAM PRODUCT ENABLING STORAGE OF STATE OF TEMPORARY DISPLAY SCREEN MAGNIFICATION VIEW

(75) Inventor: Mikko K. Mäkelä, Tampere (FI)

(73) Assignee: Nokia Corporation

( * ) Notice: Subject to any disclaimer, the term of this patent is extended or adjusted under 35 U.S.C. 154(b) by 2040 days.

(21) Appl. No.: 11/174,110

(22) Filed: Jun. 30, 2005

(65) Prior Publication Data
US 2007/0006097 A1 Jan. 4, 2007

(51) Int. Cl.
*G06F 3/048* (2006.01)
(52) U.S. Cl. ........ 715/810; 715/760; 715/764; 715/781; 715/792; 715/802
(58) Field of Classification Search ........ 715/810, 715/760, 764, 781, 788, 792, 800, 802, 815, 715/821, 822, 864
See application file for complete search history.

(56) References Cited

U.S. PATENT DOCUMENTS

| | | | | |
|---|---|---|---|---|
| 4,821,029 | A * | 4/1989 | Logan et al. | 345/173 |
| 5,623,589 | A * | 4/1997 | Needham et al. | 715/853 |
| 6,593,944 | B1 | 7/2003 | Nicolas et al. | 345/744 |
| 7,114,128 | B2 * | 9/2006 | Koppolu et al. | 715/781 |
| 7,164,410 | B2 * | 1/2007 | Kupka | 345/156 |
| 7,240,294 | B2 * | 7/2007 | Fitzsimons et al. | 715/788 |
| 2003/0016247 | A1 * | 1/2003 | Lai et al. | 345/764 |
| 2004/0133848 | A1 | 7/2004 | Hunbt et al. | 715/500 |
| 2005/0024322 | A1 | 2/2005 | Kupka | 345/156 |
| 2005/0174590 | A1 * | 8/2005 | Kubo | 358/1.9 |
| 2005/0235220 | A1 * | 10/2005 | Duperrouzel et al. | 715/788 |

FOREIGN PATENT DOCUMENTS

| | | |
|---|---|---|
| EP | 0 949 571 A2 | 10/1999 |
| KR | 2002-0001292 A | 1/2002 |
| WO | WO-01/35235 A1 | 5/2001 |
| WO | WO-02/082418 A2 | 10/2002 |
| WO | WO-2005029308 A2 | 3/2005 |

OTHER PUBLICATIONS

Non-Final Rejection for Korean Application No. 10-2008-7001348 dated Apr. 30, 2010.

* cited by examiner

*Primary Examiner* — Doon Chow
*Assistant Examiner* — Anil Kumar
(74) *Attorney, Agent, or Firm* — Alston & Bird LLP

(57) ABSTRACT

Disclosed is a method, a computer program, a wireless communications device, a browser and an apparatus to display an object to a viewer, where the displayed object has an associated area. In response to the viewer selecting the displayed object, the method, computer program product, wireless communications device, browser and apparatus display the object partitioned into a plurality of sub-areas. In response to the viewer selecting one of the sub-areas, information is saved related to the selection and at least one function associated with the selected sub-area is executed. In response to the viewer again selecting the object, the object is displayed partitioned into the plurality of sub-areas with a focus placed in accordance with the saved information.

33 Claims, 2 Drawing Sheets

APPARATUS, METHOD AND COMPUTER PROGRAM PRODUCT ENABLING STORAGE OF STATE OF TEMPORARY DISPLAY SCREEN MAGNIFICATION VIEW

TECHNICAL FIELD

The teachings in accordance with the exemplary embodiments of this invention relate generally to document viewers and, more specifically, relate to browsers used with mobile devices having a limited display screen area.

BACKGROUND

When using a mobile device, such as a cellular telephone, having a limited display screen area certain accommodations can be made for displaying image content to a user. The image content may be obtained from a remote content provider, such as via the Internet using an Internet browser, or it may be generated locally in the device itself.

One non-limiting example of a mobile device browser of interest to the teachings of this invention is operable as an application that runs under a Series 60™ mobile device software platform that is provided by the assignee of this patent application. For example, the browser may be embodied as a full HTML browser (e.g., HTML 4.01, WAP 2.0).

The browser handles image maps such that, in some cases, initially an entire image map (e.g., a document image) is displayed as one selectable element, and upon selection the image map is opened into a magnified view where the image map is shown with different areas that are selectable by the user. By selecting one of the areas the user is then, for example, navigated to another page. In this manner the user is enabled to sequentially select of all the selectable areas of the image map.

The magnified view of the image map is not a document itself, but is instead a temporary view from the original document, it is thus not stored in the browser's navigation history. When the user navigates back from the page, the temporary magnification view is skipped over and the user is taken directly to the original page. However, when the user is back on the original page, and then selects the image map again, the magnification view is shown so that a first default area (a corner area) of the image map is again focused by default. That is, the browser display function does not "remember" the area that was last selected by the user, and to which the user may wish to return.

SUMMARY OF THE EXEMPLARY EMBODIMENTS

The foregoing and other problems are overcome, and other advantages are realized, in accordance with the non-limiting and exemplary embodiments of this invention.

Disclosed is a method, a computer program, an electronic device and an apparatus to display an object to a viewer where the displayed object has an associated area. In response to the viewer selecting the displayed object, the method, computer program product, wireless communications device, browser and apparatus display the object partitioned into a plurality of sub-areas. In response to the viewer selecting one of the sub-areas, information is saved related to the selection and at least one function associated with the selected sub-area is executed. In response to the viewer again selecting the object, the object is displayed partitioned into the plurality of sub-areas with a focus placed in accordance with the saved information.

Also disclosed is a browser that includes an input/output coupled to a memory, an input coupled to a user input and an output coupled to a user display. The browser displays, in response to a signal from the user input, the object partitioned into a plurality of sub-areas and in response to a further signal from the user input, the browser selects one of the sub-areas. The browser stores in the memory information related to the selection and executes at least one function associated with the selected sub-area. Further in response to the user input providing a signal to again select the object, the browser displays the object partitioned into the plurality of sub-areas with a focus placed in accordance with the saved information.

The browser may be embodied in a portable handheld device, and the object may be an image map associated with, for example, a HTML page received over a wireless link from a content provider.

Also disclosed is a method, a computer program product, an electronic device and an apparatus to display an object by displaying an object to a viewer so as to have at least one associated area; in response to the viewer selecting the displayed object, displaying the object partitioned into a plurality of sub-areas; in response to the viewer placing a focus one of the sub-areas, saving information related to the focused one of the sub-areas and in response to the viewer again selecting the displayed object, displaying the object partitioned into the plurality of sub-areas with a focus placed in accordance with the saved information.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

Figure 1:
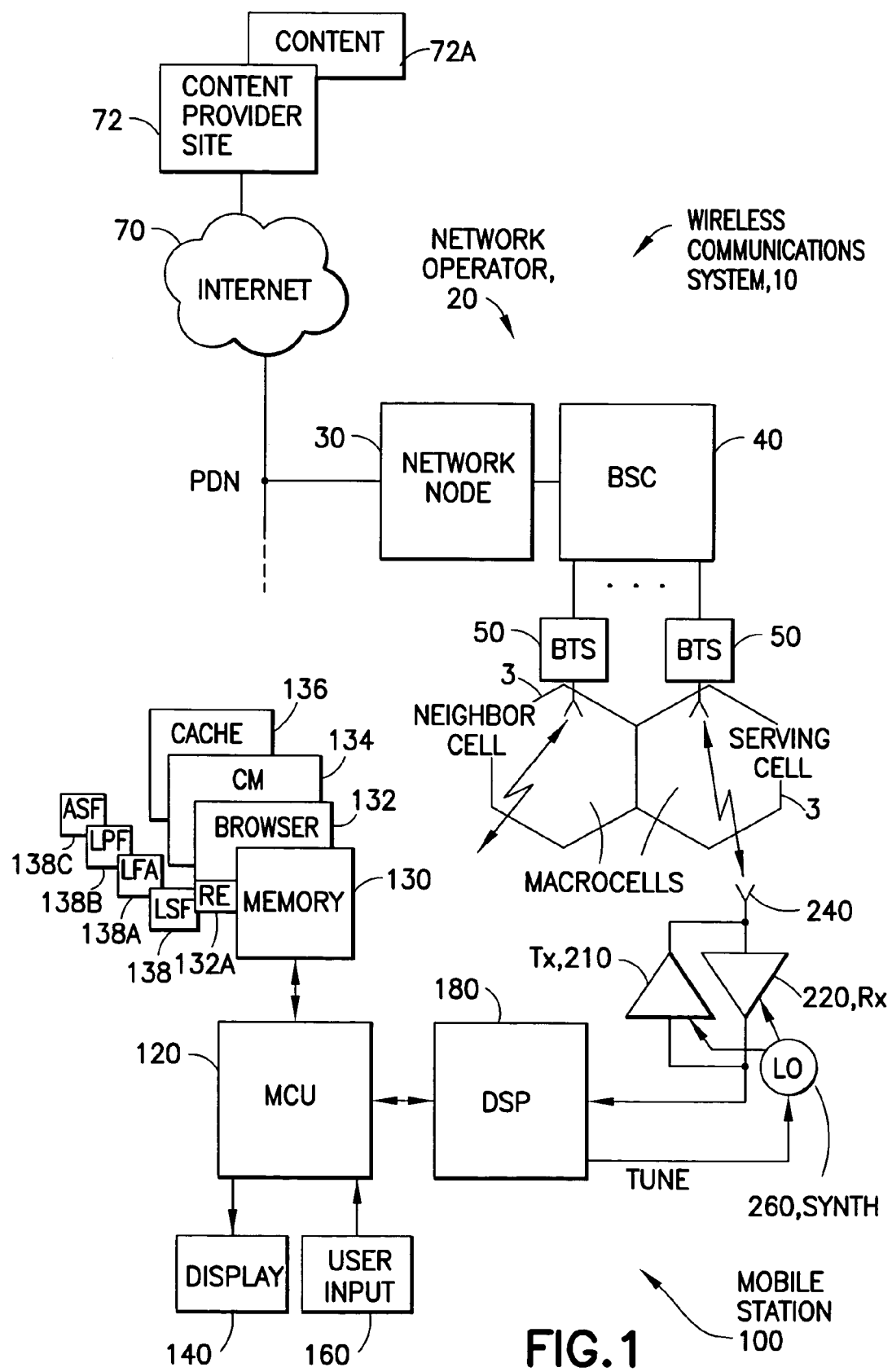
FIG. 1 is a system level block diagram of a mobile station and a wireless network operator, and represents one suitable embodiment for practicing the embodiments of this invention.

By way of introduction, and referring to FIG. 1, there is shown as a simplified block diagram an embodiment of a wireless communications system 10 having at least one electronic device, which may be embodied as a mobile station (MS) 100, that is suitable for practicing the embodiments of this invention. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

It should be appreciated that while FIG. 1 shows the mobile station 100 primarily in the context of a cellular wireless communications system, in other embodiments of this invention the mobile station 100 may instead, or in addition, interface with a wireless local area network (WLAN) and/or with a Bluetooth™ wireless network (either RF or IR), or with any other type of wireless communications network.

The air interface standard can conform to any suitable standard or protocol, and may enable both voice and data traffic, such as data traffic enabling Internet 70 access and web page downloads. Coupled via the Internet 70 is assumed to be at least one content provider site 72 having content 72A that is downloadable to the MS 100. The content may comprise an image that is displayable on a MS 100 display 140, and may be delivered as HTML pages.

The air interface standard may be compatible with a code division multiple access (CDMA) air interface standard, such as one known as cdma2000, although this is not a limitation upon the practice of this invention as the invention may be practiced using any air interface protocol (including GSM and UMTS) that supports the delivery of digital data to the MS 100.

In general, the various embodiments of the MS 100 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable and handheld units or terminals that incorporate combinations of such functions.

The MS 100 typically includes a control unit or control logic, such as a microcontrol unit (MCU) 120 having an output coupled to an input of the display 140, such as an LCD or a plasma display, and an input coupled to an output of a user input device or devices 160, as non-limiting examples, a keyboard or keypad. In other embodiments the display 140 may be a touch sensitive display, and may also then comprise a part of, or all of, the user input device 160. The user input 160 may also be implemented in whole or in part with voice recognition technology.

The MCU 120 is assumed to include or be coupled to some type of a memory 130, including a non-volatile memory for storing an operating program, such as an operating system, and other information, as well as a volatile memory for temporarily storing other data such as scratchpad memory, received content, etc. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The MS 100 can also include a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The memory 130 may be of any type suitable to the local technical environment and may be implemented using any suitable data storage technology, such as semiconductor-based memory devices, magnetic memory devices and systems, optical memory devices and systems, fixed memory and removable memory. The data processors 120, 180 may be of any type suitable to the local technical environment, and may include one or more of general purpose computers, special purpose computers, microprocessors, DSPs and processors based on a multi-core processor architecture, as non-limiting examples.

The memory 130 is assumed to include software for implementing an Internet browser 132 that may include a cache manager (CM) function 134 for interacting with a cache 136 wherein content is stored, such as the content 72A downloaded from the site 72. The browser 132 may be an application that runs under an operating system of the MS 100.

The browser 132 may be HTTP (Hypertext Transfer Protocol) compliant and/or may also be compliant with, as an example, an open source HTML rendering engine (http://khtml.info/wiki/index.php?title=Main_Page, XHTML). In any case, the browser 132 may include a rendering engine (RE) 132A component.

In accordance with certain exemplary embodiments of this invention the browser 132 and RE 132A software is enhanced to provide an ability for a user to more efficiently navigate displayable object data, such as image data.

Figure 2:
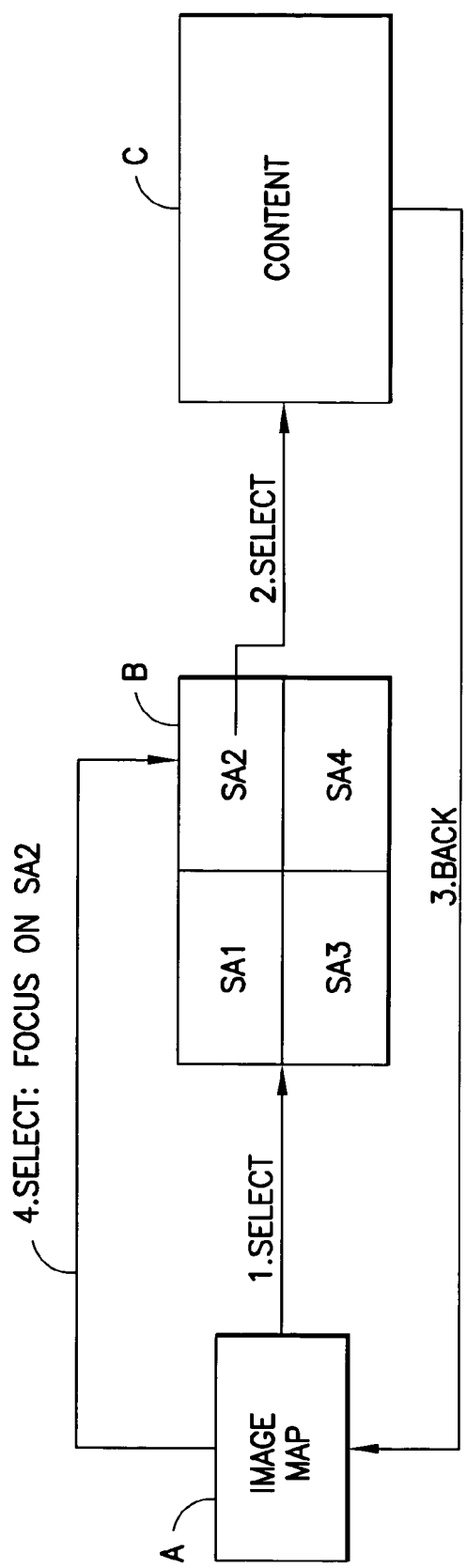
FIG. 2 illustrates a method of displaying an object, such as an image map, in accordance with the exemplary embodiments of this invention.

Referring to FIG. 2, which may be viewed also as a illustrating a method in accordance with an exemplary embodiment of this invention, the display 140 is assumed to display an object, such as an image map A (e.g., a visual display of a HTML page stored in the cache 136 and possibly obtained using the browser 132 and a download function from the content provider site 72). In response to the user selecting the image map A via the input device 160 (step 1) the image map A area is partitioned and displayed (as a temporary view) as a partitioned image map B having a plurality of sub-areas SA, shown in this non-limiting example as four sub-areas SA1, SA2, SA3 and SA4. In response to the user selecting one of the sub-areas (e.g., SA2) via the input device 160 (step 2), the content associated with the selected sub-area SA2 is displayed as C (where the content may be a web page since SA2 may be a link), and/or a function (which may be a command) associated with SA2 is executed. Note that the function may encompass accessing the link represented by SA2 to retrieve the associated content. Further, and in accordance with embodiments of this invention, the browser 132 saves an identification of SA2. In response to the user performing a Back function on the content (step 3) the user is taken back to the original page (A).

Assume now that at some subsequent time the user again selects the image map A (step 4). In response, and in accordance with embodiments of this invention, the view is shown with the focus in the partitioned image B placed on the last-selected sub-area 2 (SA2). That is, the browser 132 "remembers" the previously selected sub-area (e.g., SA2), and places the focus on the previously selected portion of the image map.

It may be noted that the content (C) can be that pointed to by SA2 (e.g., a page navigated to by accessing a link on SA2), or original content (A) after executing a command associated with the selection of SA2 in the case where the command is not navigation to a new document, but instead changes the original document A. This may be implemented, for example, with a Java™ script command that causes the re-loading of the original content (A).

To implement the functionality shown in FIG. 2 the memory 130 may include an image map last state flag (LSF) 138 as shown in FIG. 1. The LSF 38 is assumed to include a sufficient number of storage locations for expressing a largest possible sub-area number. In the illustrated example of FIG.

2 the LSF 138 may have at least two bits for expressing one of four possible sub-area numbers.

By the use of the exemplary embodiments of this invention, when the user navigates backwards/forwards within pages, the browser 132 saves in the LSF 138 an indication of which area of the image map B was last selected/viewed by the user. Thus, when the magnification view is shown again, the browser 132 rendering engine 132A accesses the LSF 138 and in response to the state information stored therein places the focus in the partitioned image B on the sub-area that was last selected.

As described in further detail below, the browser 132 rendering engine 132A may show by default a view from a position that was viewed the last time.

One desirable result is that navigation through an image map is caused to function in the same manner as when the user navigates backwards and forwards through normal page links. In general, the use of this invention decreases memory load and navigation effort of the user when navigating backwards and forwards through web pages.

The use of the exemplary embodiments of this invention is not limited to image maps of, for example, HTML pages, but may be employed with other types of temporary views of objects capable of being viewed on the display screen 140.

Further in accordance with the exemplary embodiments of this invention, information related to a last focused area (that was not necessarily selected) may be stored in the memory 130. For example, if the user selects an image map that is shown as one selectable entity, and then views the magnification view where sub-areas are focusable/selectable, and just moves the focus to a different area but does not select that area, and then closes the magnification view, information about the area on which the focus was last placed (although not selected) can be stored in the memory 130. Then, when the user selects the same image map (that is shown as one selectable entity) and is shown the magnification view, the focus may be initially placed on the same sub-area where it was placed previously, although not explicitly selected by the user. To implement this functionality the memory 130 may include a last focused area flag (LFA) 138A, as shown in FIG. 1.

Further in accordance with the exemplary embodiments of this invention, and in a manner similar to that just described above, a position from which the image map was shown last in the magnification view may be stored in the memory 130. For example, if the image map in the magnification view is wider than the available display area, the user may have horizontally scrolled the image map, and thus it may be useful if the magnification view, when shown another time, is initially shown from the same position where it was left previously. To implement this functionality the memory 130 may also include an image map last position flag (LPF) 138B, as shown in FIG. 1.

Further in accordance with the exemplary embodiments of this invention, when re-opening the magnification view the focus/position of the image map may be the same as when the image map was last left by the user, as discussed above, or the focus/position may also be set based on a prediction of what the user will request. For example, the focus may be placed on a the next sub-area after the area that was focused/selected last, and the position of the view may also be placed so that this next sub-area is visible in the display area. The aspect of the invention can be facilitated through the use of one or more of the LSF 138, the LFA 138A and the LPF 138B.

Further still in accordance with the exemplary embodiments of this invention, and while the previous description has been made primarily in the context of storing information concerning which sub-area was selected last, it is also within the scope of the invention to store information that is descriptive of which sub-areas have been selected. This feature may be useful, for example, so that when the user opens the magnification view again, any previously selected sub-areas can be indicated to the user, such as by displaying then in a different color, so that the user can readily see which sub-areas have already been selected and which have not. To implement this functionality the memory 130 may also include an image map all selected flag (ASF) 138C, as shown in FIG. 1.

With regard to these various exemplary embodiments, when storing the information regarding the last focused/selected area or position it may also be desirable to store some type of document identification together with the last focused/selected area and/or position information. For example, and considering the non-limiting example of web pages, the stored information (e.g., in the LSF 138) may be similar to:

Last selected sub-area: 4;
On document: www.nokia.com;
For object named: image_map.

Suitable modifications can be made for the LPF 138A, the LPF 138B and the ASF 138C, if used, to express the information of interest. For example, for the ASF 138C the first field may be modified to contain "Last selected sub-areas: a, b, c, d, . . . ". The name of the object may be taken, for example, from a markup's attribute. In this regard, with HTML image maps the name is presented using a "name" or "id" markup attribute in the HTML source code of the page.

In addition to handling two dimensional objects and documents, it should be appreciated that the exemplary embodiments of this invention may be applied as well with three dimensional objects and documents, such as a three dimensional view of a document based on VRML (Virtual Reality Modeling Language), or a three dimensional game.

Various modifications and adaptations may become apparent to those skilled in the relevant arts in view of the foregoing description, when read in conjunction with the accompanying drawings and the appended claims. As but some examples, the use of other similar or equivalent types of browsers/viewers, and other types of viewable objects, may be attempted by those skilled in the art. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
  causing an object to be displayed so as to have at least one associated area;
  receiving selection of the displayed object and, in response, causing the object to be displayed partitioned into a plurality of sub-areas;
  receiving selection of one of the sub-areas and, in response, causing information related to the selection to be saved and causing at least one function associated with the selected sub-area to be executed; and
  receiving selection of the object again and, in response, causing the object to be displayed partitioned into the plurality of sub-areas with a focus placed in accordance with the saved information.

2. A method as in claim 1, wherein the information that is saved comprises an identification of the selected sub-area, and wherein the focus is placed on the selected sub-area.

3. A method as in claim 1, wherein the saved information comprises an identification of a position from which the partitioned object was last viewed, and wherein the partitioned object is caused to be displayed from the same position.

4. A method as in claim 1, wherein the saved information comprises an identification of the selected sub-area, in conjunction with an identification of any previously selected sub-areas, and wherein one or more of previously selected sub-areas are indicated.

5. A method as in claim 1, wherein the focus is predictively placed based on the saved information.

6. A method as in claim 1, further comprising receiving the object from a content provider.

7. A method as in claim 1, further comprising receiving the object via a wireless link from a content provider.

8. A method as in claim 1, wherein the selections are received via a user interface of a portable handheld device.

9. A computer program product comprising a non-transitory computer readable storage medium storing program code, the program code being configured to, upon execution, direct an apparatus to at least:
cause an object to be displayed so as to have at least one associated area;
receive selection of the displayed object and, in response to, causing the object to be displayed partitioned into a plurality of sub-areas;
receive selection of one of the sub-areas and, in response, cause information related to the selection to be saved and cause at least one function associated with the selected sub-area to be executed; and
receive selection of the object again and, in response, causing the object to be displayed partitioned into the plurality of sub-areas with a focus placed in accordance with the saved information.

10. A computer program product as in claim 9, wherein the information that is saved comprises an identification of the selected sub-area, and wherein the focus is placed on the selected sub-area.

11. A computer program product as in claim 9, wherein the saved information comprises an identification of a position from which the partitioned object was last viewed, and wherein the partitioned object is caused to be displayed from the same position.

12. A computer program product as in claim 9, wherein the saved information comprises an identification of the selected sub-area, in conjunction with an identification of any previously selected sub-areas, and wherein one or more of previously selected sub-areas are indicated.

13. A computer program product as in claim 9, wherein the focus is predictively placed based on the saved information.

14. A computer program product in claim 9, wherein the apparatus is further directed to receive the object from a content provider.

15. A computer program product as in claim 9, wherein the apparatus is further directed to receive the object via a wireless link from a content provider.

16. A computer program product as in claim 9, wherein the selections are received via a user interface of a portable handheld device.

17. An apparatus comprising a processor and a memory storing program code, the memory and program code being configured to, with the processor, direct the apparatus to at least:
cause an object to be displayed, the displayed object having an associated area;
receive selection of the displayed object and, in response, causing the object to be displayed partitioned into a plurality of sub-areas;
receive selection of one of the sub-areas and, in response, cause information related to the selection to be saved in the memory and cause at least one function associated with the selected sub-area to be executed; and
receive selection of the object again and, in response, cause the object to be displayed partitioned into the plurality of sub-areas with a focus placed in accordance with the saved information.

18. An apparatus as in claim 17, wherein the information that is saved comprises an identification of the selected sub-area, and wherein the focus is placed on the selected sub-area.

19. An apparatus as in claim 17, wherein the information that is saved comprises an identification of a position from which the partitioned object was last viewed, and wherein the partitioned object is caused to be displayed from the same position.

20. An apparatus as in claim 17, wherein the saved information comprises an identification of the selected sub-area, in conjunction with an identification of any previously selected sub-areas, and wherein one or more of previously selected sub-areas are indicated.

21. An apparatus as in claim 17, wherein the apparatus is directed to place the focus predictively based on the saved information.

22. An apparatus as in claim 17, wherein the apparatus is further directed to receive the object from a content provider.

23. An apparatus as in claim 17, further comprising a wireless transceiver, and wherein the apparatus is further directed to receive the object via a wireless link from a content provider.

24. An apparatus as in claim 17, wherein the stored program comprises a browser.

25. Apparatus comprising a user interface means comprised of visual display means and user input means, further comprising processor means operably connected to memory means and operating under control of a stored program for displaying an object to a viewer, the displayed object having an associated area, said processor means further responsive to the user input means providing a signal for selecting the displayed object, for partitioning the object into a plurality of sub-areas and displaying the partitioned object; further responsive to the user input means providing a signal to select one of the sub-areas, for storing in the memory means information related to the selection and for executing at least one function associated with the selected sub-area, and further in response to the user input means providing a signal to again select the object, for displaying the object partitioned into the plurality of sub-areas with a focus placed in accordance with the saved information.

26. Apparatus as in claim 25, wherein the processor means displays an object received from a content provider.

27. Apparatus as in claim 25, further comprising wireless transceiver means, and wherein the processor means displays an object received over a wireless link from a content provider.

28. Apparatus as in claim 25, wherein the stored program comprises a browser.

29. A browser, comprising an input/output coupled to a memory, an input coupled to a user input and an output coupled to a display, said browser displaying an object on the display, the displayed object map having an associated area; in response to a signal from the user input selecting the displayed object, the browser displaying the object partitioned into a plurality of sub-areas; in response to a further signal from the user input selecting one of the sub-areas, storing in the memory information related to the selection and executing at least one function associated with the selected sub-area, and further in response to the user input providing a signal to again select the object, displaying the object partitioned into the plurality of sub-areas with a focus placed in accordance with the saved information.

30. A browser as in claim 29, embodied in a portable handheld device.

31. A browser as in claim 29, wherein the object is associated with a HTML page received over a wireless link from a content provider.

32. A browser as in claim 29, wherein the object is associated with an XHTML page received over a wireless link from a content provider.

33. A computer program product comprising a program embodied in a non-transitory computer readable storage medium, the program being configured to, upon execution, directs an apparatus to at least:
- cause an object to be displayed so as to have at least one associated area;
- receive selection of the displayed object and, in response, cause the object to be displayed partitioned into a plurality of sub-areas;
- receive an indication of a focus being placed on one of the sub-areas, causing information related to the focused on sub-area;
- receiving a second selection of the displayed object and, in response, causing the object to be displayed partitioned into the plurality of sub-areas with a focus placed in accordance with the saved information.

* * * * *